J. W. CAMPBELL.
Sawing-Machines.

No. 151,565.

Patented June 2, 1874.

Witnesses

UNITED STATES PATENT OFFICE.

JAMES W. CAMPBELL, OF NEW YORK, N. Y.

IMPROVEMENT IN SAWING-MACHINES.

Specification forming part of Letters Patent No. 151,565, dated June 2, 1874; application filed May 12, 1874.

*To all whom it may concern:*

Be it known that I, JAMES W. CAMPBELL, of the city, county, and State of New York, have invented an Improvement in Sawing-Machines, of which the following is a specification:

This invention consists in the combination, in a sawing-machine, of a reciprocating table sustained on vibrating supports, and a guide attached to the stationary saw-frame, to guide and prevent the lateral movement of the table.

The object of the invention is to avoid the friction caused by a table moving on rollers or slides, and to enable the table to move more easily.

Figure 1:
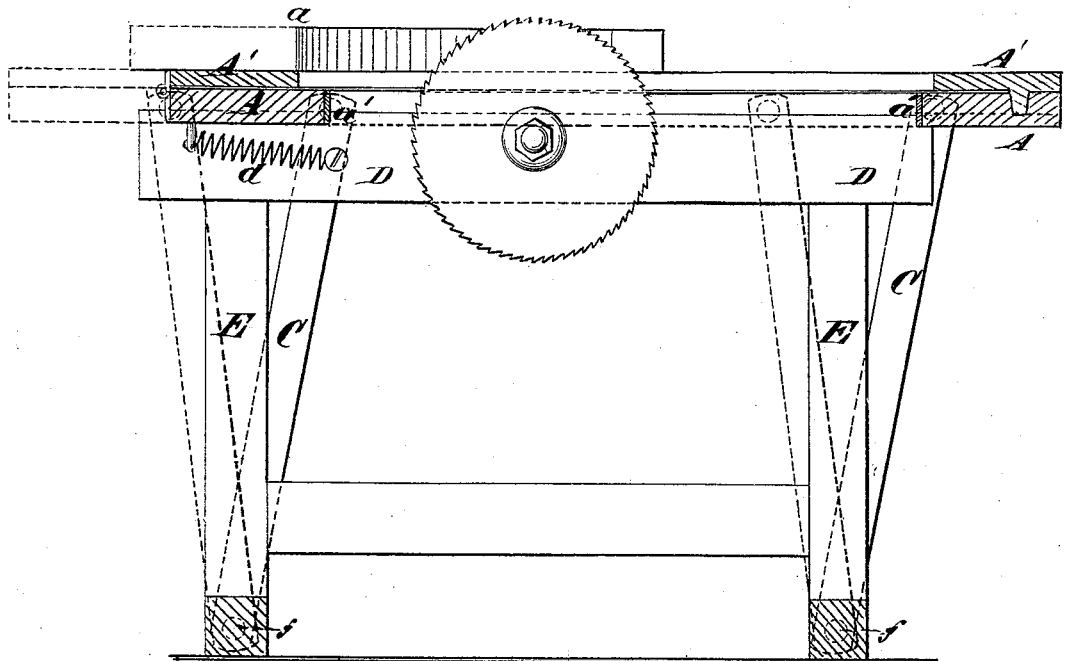
Figure 2:
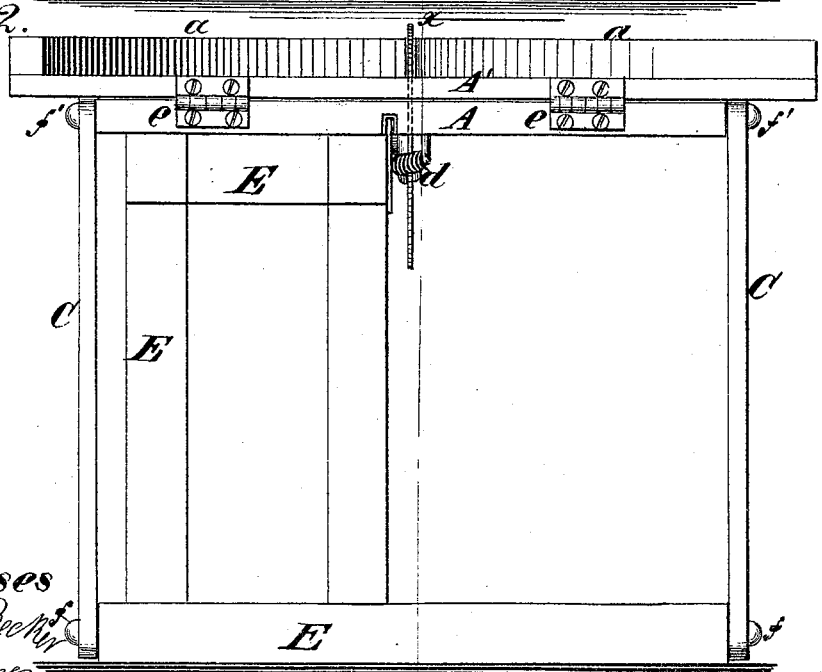

In the accompanying drawing, Figure 1 is a vertical longitudinal section, on the line $x\ x$ in Fig. 2, of my improved machine. Fig. 2 is an elevation, showing the rear end of the machine.

E E is the frame of the machine, to which the lower ends of the supports C C are pivoted at $f f$. The table is composed of two parts, A A', held together at their rear ends by hinges $e\ e$. The lower part A is a frame, while the upper part A' is solid, but is provided with a slot for the reception of the saw B. To the lower part of the table are pivoted, at $f'\ f'$, the supports C C C, all of which are parallel. The number of supports may be increased according to the size or length of the table. A guide, D, is fastened to the upper part of the frame of the machine, and projects into the under part of the table, to a distance sufficient to keep the guide always engaged with the table. The slotted metallic pieces $a'\ a'$ are designed to prevent the wearing out of the slot in the wooden table, and to keep the same firmer. A spring, $d$, fastened to the guide-piece D and to the lower part A of the table, serves to force the same forward to its original position, when it is pushed back, as indicated by dotted lines in the drawing, Fig. 1. $a\ a$ represent a miter-sawing attachment fastened to the table.

The table is operated to feed the material to the saw by the operator pressing or pushing gently against it with his hip or body. When the pressure is removed the table is brought back by the spring, the operation of which is assisted by the weight of the table after the vibrating supports have moved forward beyond a vertical position.

What I claim as new, and desire to secure by Letters Patent, is—

The guide D, in combination with the reciprocating table A of a sawing-machine, and oscillating supports C C, as set forth.

J. W. CAMPBELL.

Witnesses:
 HENRY T. BROWN,
 MICHAEL RYAN.